UNITED STATES PATENT OFFICE.

NEWELL H. GILBERT AND ARTHUR G. GILBERT, OF FULTON, ASSIGNORS OF ONE-THIRD THEIR RIGHT TO RANSOM B. TRUE, OF SYRACUSE, N. Y.

IMPROVEMENT IN PROCESSES OF MANUFACTURING BUCKWHEAT-FLOUR.

Specification forming part of Letters Patent No. 210,517, dated December 3, 1878; application filed March 6, 1878.

*To all whom it may concern:*

Be it known that we, NEWELL H. GILBERT and ARTHUR G. GILBERT, of Fulton, in the county of Oswego and State of New York, have invented new and useful Improvements in the Processes of Manufacturing Buckwheat-Flour, of which the following is a specification:

Buckwheat-flour is generally produced either by grinding the grain after having been scoured, and bolting the product for separating the flour from the offal, or by first hulling the grain, then separating the hulls from the hulled kernels by an air-blast, and then grinding the hulled kernels and bolting the product.

The first process is objectionable, for the reason that a large portion of the shucks or hulls and all of the thin yellow skin lying between the hull and the starchy part of the berry are ground, and cannot be completely separated from the flour by bolting, the ground portion of the hulls rendering the flour dark and specky, and the ground portions of the inner yellow skin imparting to the flour an unpleasant bitter taste.

The second process is objectionable, for the reason that the inner skin is not detached from the starchy part of the kernel by the process of hulling, and that the fine flour produced in hulling the grain is carried off by the air-current in separating the hulls from the hulled kernels, while at the same time the separation of the hulls from the hulled kernels is more or less imperfect, in consequence of which defects the flour produced is specky and more or less bitter.

The object of our invention is to separate from the flour-producing parts of the kernels before grinding them all matter which is detrimental to the quality of the flour, and its nature will be fully understood from the following description.

In carrying out our improved process we first scour the grain, in the usual manner, and then dry the grain in a hot-air current, preferably produced by a steam-heating apparatus to prevent scorching of the grain. These two steps of the process are old and well known. The grain so prepared is then coarsely cracked or broken between two suitable stones, preferably so as to divide each berry into about ten or twelve pieces, whereby the shucks or hulls and the inner fine skin are detached from the flour-producing parts of the berries. The product of this part of our process is a mixture of detached hulls and skins and coarse pieces of the starchy matter of the berry, resembling farina, and a small quantity of fine flour. This operation of cracking differs from the operation of hulling, in so far as in the latter operation the aim is to leave the flour-producing part of the berry intact and simply strip off the enveloping hull, which is, however, never perfectly accomplished in a hulling-machine, while the inner thin skin remains attached to the berry.

We prefer to use vertical stones for cracking the grain, the runner being rigidly secured to the driving-shaft, so as to remain at a uniform distance from the stationary stone. The grain so broken or cracked is then passed through a reel or screen covered with fine bolting-cloth, preferably No. 13, whereby the fine flour produced in cracking is separated from the rest of the product, the fine flour passing through the meshes of the screen or reel, and the fragments of starchy matter, hulls, and skins passing over the tail end of the screen or reel. These tailings are then passed through a second screen or reel covered with very coarse cloth, preferably wire-cloth having about ten meshes to the inch, by means of which the detached hulls and a portion of the skins are separated from the farina or fragments of starchy matter, the latter passing, with the fine portions of the inner skins, through the meshes of the screen or reel, and the hulls and large pieces of skin passing over the tail end of the screen or reel.

The farina or fragments of starchy matter are then subjected to the action of an air-current, preferably upon a shaking screen, whereby the finer impurities adhering to the farina, such as small pieces of the inner skin and the tough impurities adhering to the germ end of the kernels, are separated from the farina and carried off, leaving the latter entirely free from impurities. This purified farina is then ground between ordinary millstones, so as to produce flour of the desired degree of fineness, and the product of grinding, together with the fine flour resulting from the separation in the first reel, is then bolted and finished in the usual manner.

When a comparatively small quantity of grain is treated at a time, the two separations may be accomplished in one reel or screen, the head of which is provided with cloth of fine texture, so as to permit the fine flour to pass through the meshes, and the tail portion of the reel or screen being provided with coarse cloth, permitting the farina to pass through its meshes, and discharging the hulls and skins over its tail end.

If preferred, the separation of the hulls and skins and finer impurities from the farina may be made upon the same screen by causing an air-current to pass through the same, so that the finer impurities are carried off by the air-current, while the farina passes through the meshes of the screen, and the hulls are discharged over the tail end thereof.

By our improved process all of the hulls and skins enveloping the starchy part of the kernel are completely detached and separated from the flour-producing parts before grinding, thereby producing flour which is free from specks and bitter ingredients.

We claim as our invention—

The herein-described process of manufacturing buckwheat-flour, consisting of, first, coarsely cracking or breaking the grain, so as to detach the hulls and inner skins from the starchy parts of the kernels, then separating the fine flour from the product, then separating the hulls from the farina or starchy fragments, then separating the fine skins from the farina, then grinding the farina to flour and bolting the product, together with the fine flour from the first separation, substantially as set forth.

NEWELL H. GILBERT.
ARTHUR G. GILBERT.

Witnesses:
RALPH O. BARNES,
RANSOM B. TRUE.